US012759444B2

(12) United States Patent
Kuttumukkula Chandrasekaran et al.

(10) Patent No.: US 12,759,444 B2
(45) Date of Patent: Oct. 13, 2026

(54) VEHICLE SEAT ASSEMBLIES HAVING TIE DOWN BRACKETS

(71) Applicant: Toyota Motor Engineering & Manufacturing North America, Inc., Plano, TX (US)

(72) Inventors: Sathya Shankar Kuttumukkula Chandrasekaran, Novi, MI (US); Brandon J. Vick, Milan, MI (US); Peter J. Moegling, Whitmore Lake, MI (US); Brian J. Hewitt, Brighton, MI (US); Arpit Bhatt, Canton, MI (US); Alexander W. Schuyler, Ann Arbor, MI (US)

(73) Assignees: Toyota Motor Enineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 95 days.

(21) Appl. No.: 18/635,205

(22) Filed: Apr. 15, 2024

(65) Prior Publication Data

US 2025/0319801 A1 Oct. 16, 2025

(51) Int. Cl.

*B60N 2/90* (2018.01)
*B60N 2/24* (2006.01)
*B60N 2/64* (2006.01)

(52) U.S. Cl.

CPC ............... *B60N 2/646* (2013.01); *B60N 2/24* (2013.01); *B60N 2/933* (2018.02)

(58) Field of Classification Search

CPC .............. B60N 2/01508; B60N 2/3045; B60N 2/3047; B60R 9/00; B60R 11/00

See application file for complete search history.

(56) References Cited

U.S. PATENT DOCUMENTS 4,061,396 A * 12/1977 Reida ....................... A47C 7/02 297/283.1
6,264,260 B1 7/2001 Kronner et al.
(Continued)

FOREIGN PATENT DOCUMENTS

CN 108162736 A 6/2018
EP 3656364 A1 5/2020
JP 5987480 B2 9/2016

OTHER PUBLICATIONS

Amazon. D Rings Tie Down Anchors Hooks. Oct. 3, 2023. https://www.amazon.com/Anchors-D-Rings-Trailer-Capacity-Bracket/dp/B0CKB8N811/ (Year: 2023).*

*Primary Examiner* — Ashesh Dangol

(74) *Attorney, Agent, or Firm* — DINSMORE & SHOHL LLP

(57) ABSTRACT

A vehicle seat assembly includes a seat cushion portion pivotable between a seated position and an access position. The seat cushion portion further includes a seat cushion frame. An underframe having a pair of sidewalls and a front wall defines a battery cavity beneath the seat cushion portion. An opening is formed in the front wall of the underframe. A tie down bracket includes a lower bracket portion extending beneath the seat cushion portion. A releasable fastener that extends through the at least one opening and releasably couples the lower bracket portion to a frame member of the underframe to secure the seat cushion portion in the seated position.

14 Claims, 5 Drawing Sheets

(56) References Cited

U.S. PATENT DOCUMENTS

| | | | | |
|---|---|---|---|---|
| 2006/0072994 | A1* | 4/2006 | Noding | B60R 11/00 414/462 |
| 2016/0193949 | A1* | 7/2016 | Pywell | B60N 3/104 297/188.1 |
| 2025/0198448 | A1* | 6/2025 | Spencer | F16B 37/044 |

* cited by examiner

VEHICLE SEAT ASSEMBLIES HAVING TIE DOWN BRACKETS

TECHNICAL FIELD

The present specification generally relates to vehicle seat assemblies and, more specifically, to vehicle seat assemblies having tie down brackets for securing seat members of the vehicle seat assemblies.

BACKGROUND

Many modern vehicles, such as trucks, are provided with seat assemblies having seat cushion assemblies that are pivotable upward to expose a storage area underneath the seat cushion assemblies. In electric and hybrid models, the storage area houses battery systems and other electronic components beneath the seat cushion assemblies. These conventional vehicle seat assemblies typically include a fastening mechanisms, such as grommets, which are used to secure the seat portion to an underframe of the assembly. However, these fastening mechanisms require replacement after the disengaging, which is time-consuming and cumbersome during maintenance procedures. Moreover, existing vehicle seat assemblies have limited versatility across different vehicle models, particularly in newer vehicle designs that include integrated high-voltage ("HV") battery systems. Accordingly, a need exists for a vehicle seat assembly having a secure, operable seat attachment and release mechanism that may allow for efficient maintenance without compromising ergonomic and/or safety features of the vehicle seat assembly.

SUMMARY

In one embodiment, a vehicle seat assembly is disclosed. The vehicle seat assembly includes a seat cushion portion pivotable between a seated position and an access position. The seat cushion portion further includes a seat cushion frame. An underframe having a pair of sidewalls and a front wall defines a battery cavity beneath the seat cushion portion. At least one opening is formed in the front wall of the underframe. A tie down bracket includes a lower bracket portion extending beneath the seat cushion portion. A releasable fastener extends through the at least one opening and releasably couples the lower bracket portion to a frame member of the underframe to secure the seat cushion portion in the seated position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
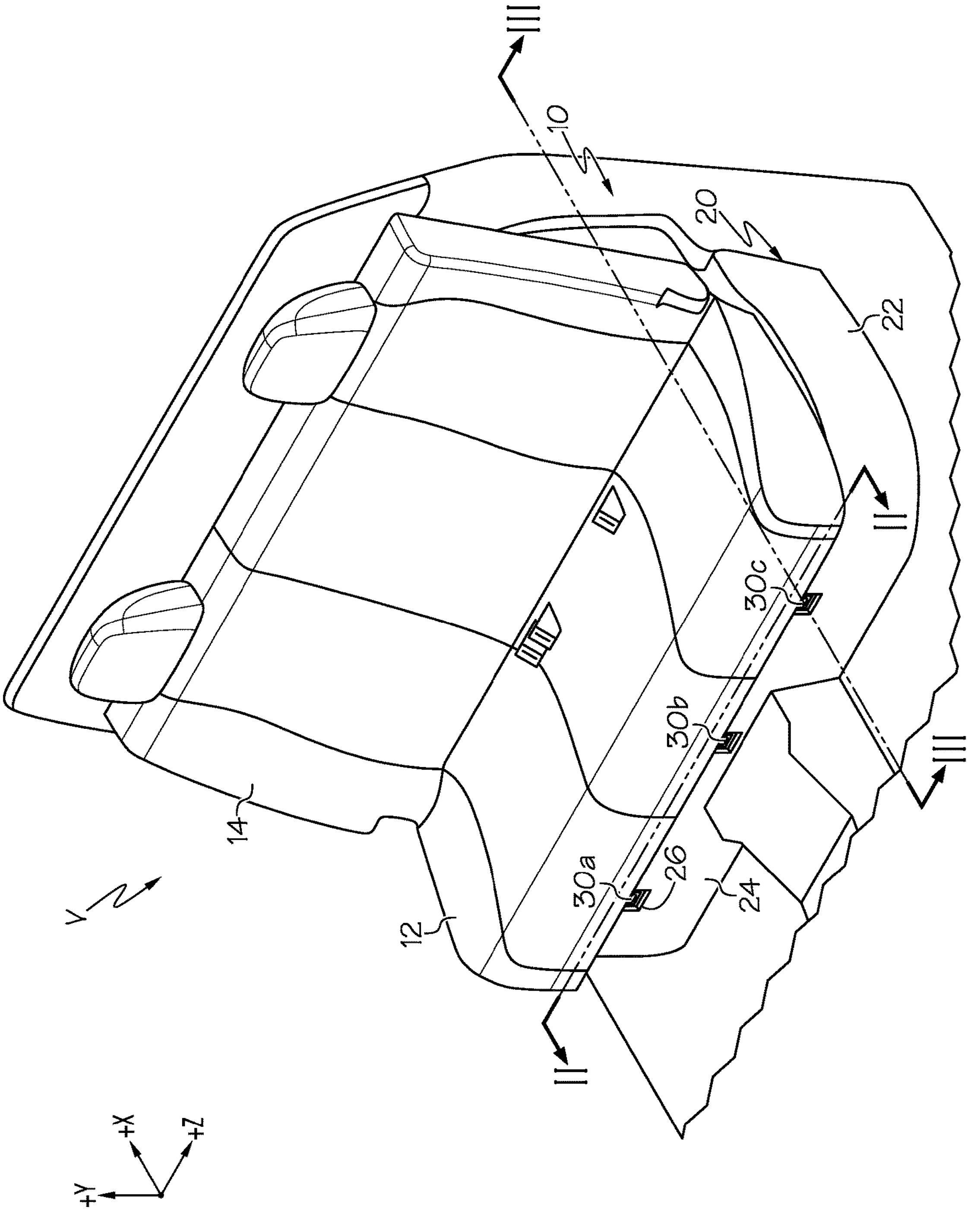
FIG. 1A schematically depicts a perspective view of a vehicle seat assembly in a seated position, according to one or more embodiments described and illustrated herein.

Embodiments described herein are generally directed to tie down brackets for vehicle seat assemblies. The tie down bracket includes an upper bracket portion fixedly attached to a seat cushion frame formed within a seat cushion portion of the vehicle seat assembly, and a lower bracket portion that extends beneath the seat cushion portion of the vehicle seat assembly. The lower bracket portion is configured to be releasably secured within an opening formed within an underframe of the vehicle seat assembly, such as via a clip mechanism or other similar releasable fastener. The disclosed tie down bracket may allow for a quick release engagement that is user-friendly and reduces the time and effort required to access a cavity formed within the underframe in which a battery system may be stored.

As will be described in additional detail herein, the vehicle seat assembly includes a seat cushion portion that is pivotable between a seated position and an access position and includes a lower seat frame. An underframe having a pair of sidewalls and a front wall defines a battery cavity beneath the seat cushion portion. At least one opening is formed in the front wall of the underframe, and a tie down bracket including a lower bracket portion extends beneath the seat cushion portion. The lower bracket portion aligns with the at least one opening formed in the front wall of the underframe, and a releasable fastener releasably couples the lower bracket portion to the at least one opening to secure the seat cushion portion in the seated position.

Various embodiments of vehicle seat assemblies and tie down brackets are described in detail below. Whenever possible, the same reference numerals will be used throughout the drawings to refer to the same or like parts.

Figure 1B:
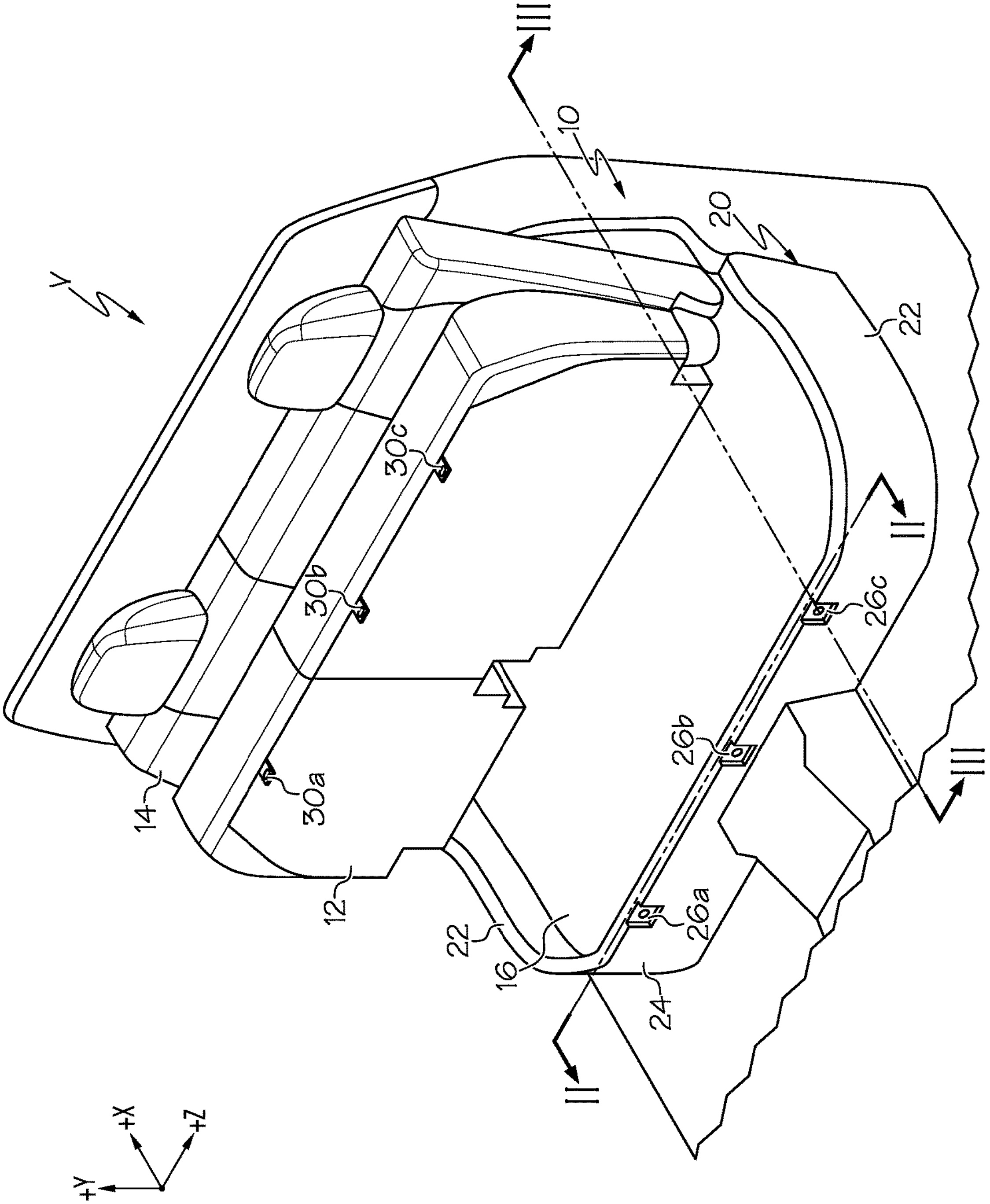
FIG. 1B schematically depicts a perspective view of the vehicle seat assembly of FIG. 1A in an access position, according to one or more embodiments described and illustrated herein.

Referring now to FIGS. 1A and 1B, a vehicle V having a vehicle seat assembly 10 is illustrated. As illustrated in FIGS. 1A and 1B, the vehicle seat assembly 10 may include a lower seat member such as a seat cushion portion 12 and an upper seat member such as a seat back portion 14, with the seat cushion portion 12 being pivotable between a seated position (FIG. 1A), in which the seat cushion portion 12 is positioned to support an occupant above a floor of the vehicle V, and an access position (FIG. 1B), in which the seat cushion portion 12 is pivoted towards the seat back portion 14 to allow for access to a battery cavity 16 formed beneath the seat cushion portion 12, as will be described in additional detail herein.

In these embodiments, the vehicle seat assembly 10 may further include an underframe 20, which may define the battery cavity 16 formed beneath the seat cushion portion 12. For example, in these embodiments, the underframe 20 may include a pair of sidewalls 22 extending in a vehicle longitudinal direction (e.g., in the +/−x-direction as depicted in the coordinate axes of FIGS. 1A and 1B) and a front wall 24 that extends between the pair of sidewalls 22. As depicted most clearly in FIG. 1B, the pair of sidewalls 22 and the front wall 24 of the underframe 20 may define the battery cavity 16, which may be accessible when the seat cushion portion 12 is moved to the access position. In embodiments, a cover may be provided on an exposed surface of the pair of sidewalls 22 and the front wall 24 to provide an aesthetically pleasing appearance. The underframe 20 also includes a frame member 28 positioned behind the front wall 24.

As further depicted in FIGS. 1A and 1B, at least one opening 26 is recessed with respect to the front wall 24. As described in greater detail below, the at least one opening 26 is configured to releasably engage a tie down bracket 30 of the vehicle seat assembly 10. For example, in these embodiments, the tie down bracket 30 may be used to secure the seat cushion portion 12 in the seated position In particular, a releasable fastener may extend through the at least one opening 26 of the front wall 24, the tie down bracket 30, and a frame member opening 29 formed in the frame member 28 of the underframe 20, such that the tie down bracket 30 may secure the seat cushion portion 12 in the seated position. Operation of the tie down bracket 30 will be described in additional detail herein with reference to FIGS. 2A to 3B.

Referring still to FIGS. 1A and 1B, it should be appreciated that the tie down bracket 30 may be releasable from the at least one opening 26 of the underframe 20 to allow the seat cushion portion 12 to pivot between the seated position and the access position. For example, in the seated position, a lower bracket portion 32 of the bracket 30 may be aligned with the at least one opening 26 of the underframe 20, and a removable fastener may be disposed through the lower bracket portion 32 and received by the at least one opening 26 formed in the front wall of the underframe 20 and the frame member opening 29 formed in the frame member 28 in order to secure the seat cushion portion 12 in the seated position. As depicted in FIG. 1A, in the seated position, the seat cushion portion 12 may be positioned adjacent the underframe 20, such that the seat cushion portion 12 contacts at least a portion of the pair of sidewalls 22 and the front wall 24 of the underframe 20. Accordingly, when the seat cushion portion 12 is in the seated position, the seat cushion portion 12 may enclose the battery cavity 16, such that the battery cavity 16 is inaccessible.

As further depicted in FIGS. 1A and 1B, the seat cushion portion 12 may be pivoted relative the underframe 20 when the removable fastener is released from the at least one opening 26 formed in the front wall 24 and the frame member opening 29 formed in the frame member 28. For example, as depicted in FIG. 1B, when the removable fastener is released from the frame member 28, the seat cushion portion 12 may be tipped-up (e.g., rotated about the +z-axis as depicted in FIGS. 1A and 1B), such that the seat cushion portion 12 is positioned adjacent the seat back portion 14 and the battery cavity 16 is exposed. In these embodiments, it should be appreciated that exposing the battery cavity 16 may allow for an operator and/or technician to easily and efficiently perform maintenance on a battery system (not depicted) disposed within the battery cavity 16.

Referring still to FIGS. 1A and 1B, it should be appreciated that, in the embodiments described herein, the vehicle seat assembly 10 may include a plurality of tie down brackets 30, while the underframe 20 may include a plurality of openings 26 configured to engage the lower bracket portion 32 of each of the plurality of tie down brackets 30. For example, as illustrated in FIG. 1B, the vehicle seat assembly 10 may include a first tie down bracket 30*a*, a second tie down bracket 30*b*, and a third tie down bracket 30*c*, while the underframe 20 may include a first opening 26*a* configured to engage the first tie down bracket 30*a*, a second opening 26*b* configured to engage the second tie down bracket 30*b*, and a third opening 26*c* configured to engage the third tie down bracket 30*c*. Accordingly, in embodiments in which the vehicle seat assembly 10 includes the plurality of tie down brackets 30, it should be understood that each of the plurality of tie down brackets 30 may be disengaged from their respective openings 26 in order to pivot the seat cushion portion 12 between the seated position and the access position.

Although the vehicle seat assembly 10 of FIGS. 1A and 1B is depicted as including three tie down brackets 30 and three openings 26, it should be appreciated that the vehicle seat assembly 10 may include any number of tie down brackets 30 and/or openings 26 without departing from the scope of the present disclosure. For example, the vehicle seat assembly 10 may include two tie down brackets, four tie down brackets, a single tie down bracket, or any other number of tie down brackets 30. Furthermore, the vehicle seat assembly 10 may similarly include two openings, four openings, a single opening, or any other number of openings, such that the number of openings 26 is equal to the number of tie down brackets 30. Additionally, it should be appreciated that the frame member 28 of the underframe 20 may similarly include a plurality of frame member openings 29 that correspond to the number of the plurality of openings 26 formed in the front wall 24 of the underframe 20, as has been described herein.

Figure 2B:
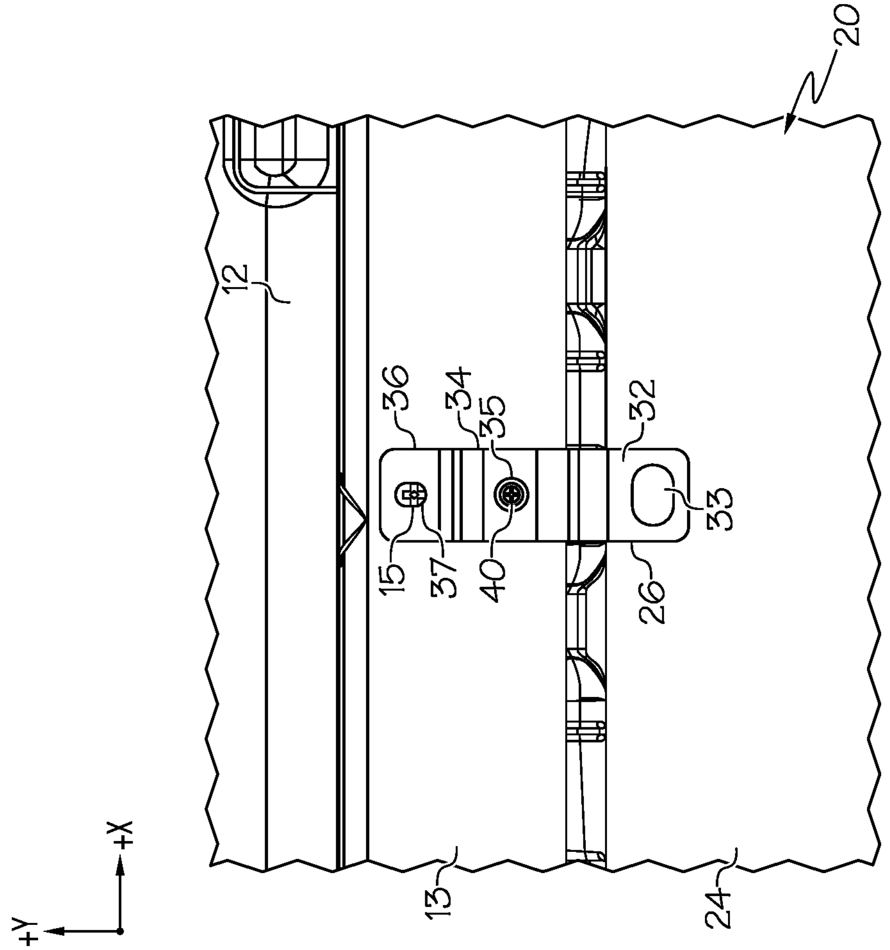
FIG. 2B depicts a partial cross-sectional view of an embodiment of the tie down bracket and vehicle seat assembly taken along line II-II of FIG. 1A, according to one or more embodiments described and illustrated herein.
Figure 2A:
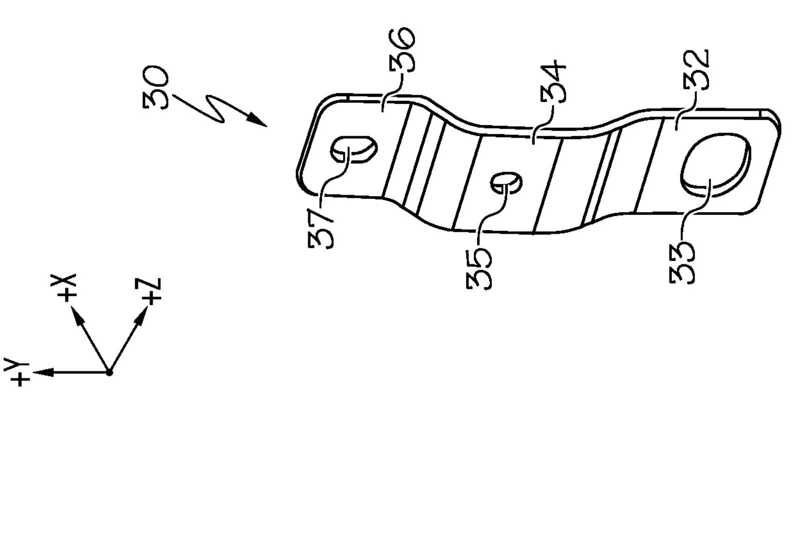
FIG. 2A depicts a perspective view a tie down bracket of the vehicle seat assembly of FIGS. 1A and 1B, according to one or more embodiments described and illustrated herein.

Referring now to FIGS. 2A and 2B, the tie down bracket 30 is depicted in additional detail. For example, in the embodiments described herein, the tie down bracket 30 may include the lower bracket portion 32, a central bracket portion 34, and an upper bracket portion 36. As illustrated most clearly in FIG. 2, the central bracket portion 34 of the tie down bracket 30 may be angled relative the lower bracket portion 32 and the upper bracket portion 36, such that the central bracket portion 34 is non-planar with the lower bracket portion 32 and the upper bracket portion 36. In these embodiments, the non-planar profile of the tie down bracket 30 may aid in distributing stress across the tie down bracket 30. For example, by angling the central bracket portion 34 relative the lower bracket portion 32 and the upper bracket portion 36, it may be possible to more evenly distribute forces exerted on the tie down bracket 30 during use, which may reduce the risk of material fatigue and/or failure at any of the lower bracket portion 32, the central bracket portion 34, and/or the upper bracket portion 36.

As further depicted in FIGS. 2A and 2B, each of the lower bracket portion 32, central bracket portion 34, and upper bracket portion 36 may include an opening configured to aid in securing and/or aligning the tie down bracket 30 to the seat cushion portion 12 and/or the underframe 20 of the vehicle seat assembly 10. For example, in these embodiments, the lower bracket portion 32 may include a lower bracket opening 33, the central bracket portion 34 may include a central bracket opening 35, and the upper bracket portion 36 may include an upper bracket opening 37.

In these embodiments, the central bracket opening 35 and the upper bracket opening 37 may be configured to fixedly attach the tie down bracket 30 to a seat cushion frame 13 of the seat cushion portion 12 and ensure proper alignment of the tie down bracket 30, respectively. For example, as depicted most clearly in FIG. 2B, the upper bracket opening 37 may be disposed about a protrusion 15 formed in the seat cushion frame 13, which may ensure that the tie down bracket 30 is aligned to allow for the lower bracket portion 32 to engage the at least one opening 26 formed in the front wall 24 of the underframe 20.

In the embodiments described herein, the protrusion 15 may be raised and/or extended from the seat cushion frame 13 and may have a cylindrical, conical, rectangular, or any other similarly shaped profile configured for engaging the upper bracket opening 37 of the tie down bracket 30. For example, the protrusion 15 may be sized and/or shaped such that a secure fit is achieved between the protrusion 15 and the upper bracket opening 37 when the upper bracket opening 37 engages the protrusion 15. In these embodiments, the fit between the protrusion 15 and the upper bracket opening 37 may be such that the upper bracket opening 37 may be disposed about the protrusion 15 without excessive force while also remaining sufficiently tight to prevent undesirable movement of the tie down bracket 30. For example, the protrusion 15 and the upper bracket opening 37 may achieve a friction fit in which the tolerance between the protrusion 15 and the upper bracket opening 37 secures the components together. Although not depicted, it should be appreciated that, in some embodiments, the protrusion 15 may further include a locking and/or fastening mechanism configured to secure the upper bracket opening 37 about the protrusion 15.

With the upper bracket opening 37 engaged with the protrusion 15 formed in the seat cushion frame 13, a fastener 40 may be inserted through the central bracket opening 35 formed in the central bracket portion 34, such that the fastener 40 extends through the central bracket portion 34 and the seat cushion frame 13 to fixedly couple the tie down bracket 30 to the seat cushion portion 12. In the embodiments described herein, the fastener 40 may be a bolt, screw, rivet, weld, or any other similar fastener capable of fixedly securing the tie down bracket 30 to the seat cushion portion 12.

Referring still to FIGS. 2A and 2B, once the central bracket portion 34 is fixedly secured to the seat cushion frame 13, the lower bracket portion 32 may extend beneath (e.g., in the −y-direction as depicted in the coordinate axis of FIG. 2B) the seat cushion portion 12, such that the lower bracket opening 33 of the lower bracket portion 32 may be aligned with the at least one opening 26 formed in the front wall 24 of the underframe 20.

Figure 3A:
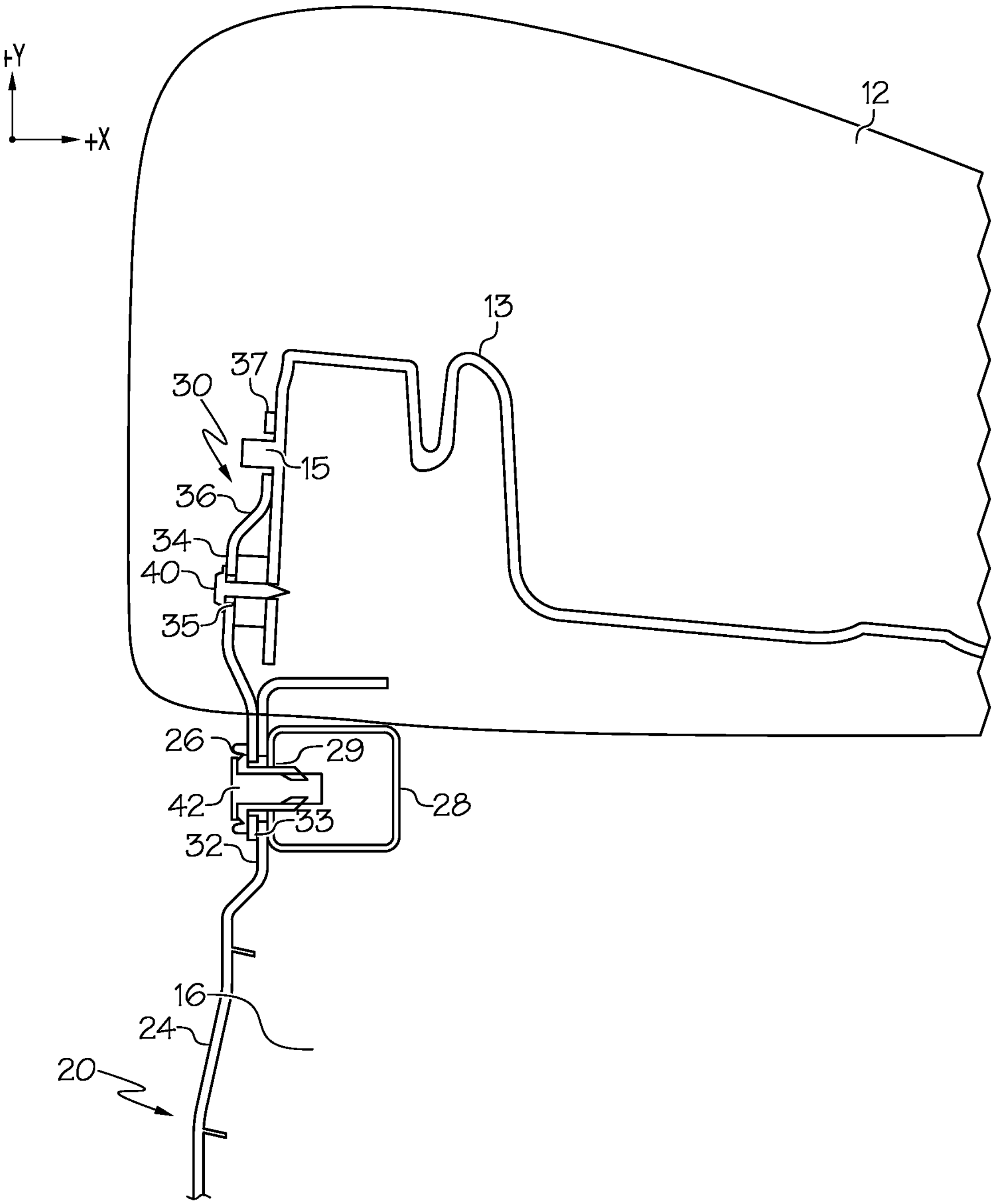
FIG. 3A depicts a partial cross-sectional view of an embodiment of the vehicle seat assembly of FIG. 1A along line III-III of FIG. 1A in the seated position, according to one or more embodiments described and illustrated herein.
Figure 3B:
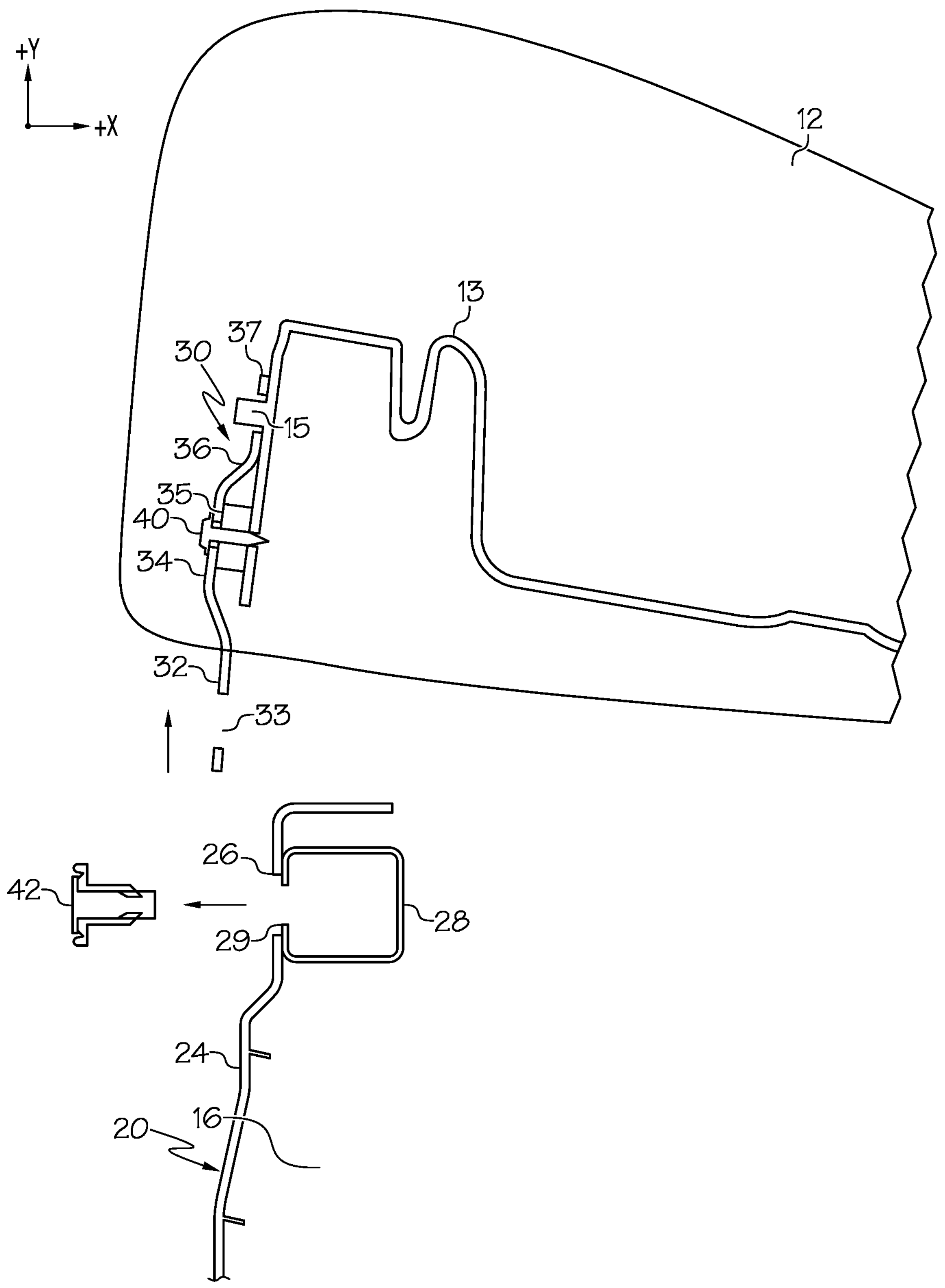
FIG. 3B depicts a partial cross-sectional view of an embodiment of the vehicle assembly of FIG. 1B along line III-III of FIG. 1B in the access position, according to one or more embodiments described and illustrated herein.

Turning now to FIGS. 3A and 3B, operation of the tie down bracket 30 will be described in additional detail. Initially, FIG. 3A depicts the seat cushion portion 12 in the seated position, in which the tie down bracket 30 is releasably coupled to and/or within the at least one opening 26 formed in the front wall 24 of the underframe 20 and/or the frame member opening 29 formed in the frame member 28 of the underframe 20. As further illustrated in FIG. 3A, in these embodiments, the upper bracket opening 37 may be engaged with the protrusion 15 extending from the seat cushion frame 13, while the central bracket portion 34 may be fixedly secured to the seat cushion frame 13 via fastener 40. In these embodiments, it should be appreciated that the central bracket portion 34 and the upper bracket portion 36 may be disposed within the seat cushion portion 12, such that the lower bracket portion 32 is the only portion of the tie down bracket 30 exposed beneath the seat cushion portion 12.

As further depicted in FIG. 3A, the lower bracket portion 32 may extend downwardly beneath the seat cushion portion 12 (e.g., in the −y-direction as depicted in the coordinate axis of FIG. 3A) such that the lower bracket opening 33 is aligned with the at least one opening 26 formed in the front wall 24 of the underframe 20 and the frame member opening 29 formed in the frame member 29 of the underframe 20. In these embodiments, a releasable fastener 42 may be disposed through the lower bracket opening 33, the at least one opening 26 formed in the front wall 24 of the underframe 20, and the frame member opening 29 of the frame member 28 of the underframe 20 in order to releasably couple the lower bracket portion 32 of the tie down bracket 30 to the frame member 28 of the underframe 20.

In the embodiments described herein, the releasable fastener 42 may be any fastener configured to securely couple the lower bracket portion 32 of the tie down bracket 30 to the underframe 20 while allowing for the easy release of the lower bracket portion 32 of the tie down bracket 30. For example, the releasable fastener 42 may include a quick-release (e.g., detent) pin, a push-pull clip, a snap-fit clip, a slide latch, a twist lock, or any other similar releasable fastener 42 without departing from the scope of the present disclosure.

Referring now to FIG. 3B, in order to move the seat cushion portion 12 from the seated position to the access position, the releasable fastener 42 may be withdrawn from the frame member 28 of the underframe 20 such that the lower bracket portion 32 of the tie down bracket 30 is released from the underframe 20. In these embodiments, with the releasable fastener 42 removed and the lower bracket portion 32 disengaged from the underframe 20, the seat cushion portion 12 may be pivoted in an upward direction (e.g., in a clockwise direction about the +z-axis as depicted in the coordinate axis of FIG. 3B), in order to expose the battery cavity 16. With the battery cavity 16 exposed, maintenance and other similar operations may be conducted on a battery system disposed within the battery cavity 16.

Once maintenance and/or repairs have been completed, the seat cushion portion 12 may be pivoted in an opposite direction (e.g., in a counterclockwise direction about the +z-axis as depicted in the coordinate axis of FIG. 3B) to move the seat cushion portion 12 to the seated position. In these embodiments, as the seat cushion portion 12 is pivoted, the lower bracket opening 33 of the lower bracket portion 32 of the tie down bracket 30 may be realigned with the at least one opening 26 formed in the front wall 24 of the underframe 20, at which point the releasable fastener 42 may be reinserted through the lower bracket opening 33 of the lower bracket portion 32 of the tie down bracket 30 and into the frame member 28 of the underframe 20 in order to secure the seat cushion portion 12 in the seated position, as has been described in detail herein.

In view of the foregoing, it should now be understood that embodiments of the present disclosure are directed to vehicle seat assemblies and tie down brackets. For example, and as described herein, the vehicle seat assembly includes a seat cushion portion that is pivotable between a seated position and an access position and includes a lower seat frame. An underframe having a pair of sidewalls and a front wall defines a battery cavity beneath the seat cushion portion. At least one opening is formed in the front wall of the underframe, and a tie down bracket including a lower bracket portion extends beneath the seat cushion portion. The lower bracket portion aligns with the at least one opening formed in the front wall of the underframe, and a releasable fastener releasably extends through the at least one opening and couples the lower bracket portion to a frame member of the underframe to secure the seat cushion portion in the seated position. It should be appreciated that the disclosed tie down bracket may allow for a quick release engagement that is user-friendly and reduces the time and effort required to access a cavity formed within the underframe in which a battery system may be stored.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed:

1. A vehicle seat assembly comprising:

a seat cushion portion pivotable between a seated position and an access position, the seat cushion portion including a seat cushion frame;

an underframe having a frame member, a pair of sidewalls and a front wall, the pair of sidewalls and the front wall define a battery cavity beneath the seat cushion portion and the frame member is positioned behind the front wall;

an opening formed in the front wall of the underframe;

a tie down bracket including a lower bracket portion extending beneath the seat cushion portion, a central bracket portion, and an upper bracket portion, the central bracket portion is non-planar with the lower bracket portion and the upper bracket portion of the tie down bracket and the central bracket portion includes a central bracket opening;

a fastener configured to extend through the central bracket opening; and a releasable fastener configured to extend through the opening and releasably couple the lower bracket portion to the frame member of the underframe to secure the seat cushion portion in the seated position.

2. The vehicle seat assembly of claim 1, further comprising a protrusion configured to secure the seat cushion frame to an upper bracket opening formed in the upper bracket portion.

3. The vehicle seat assembly of claim 2, wherein the fastener fixedly couples the central bracket portion to the seat cushion frame.

4. The vehicle seat assembly of claim 1, wherein the central bracket portion and the upper bracket portion of the tie down bracket are disposed on the seat cushion frame.

5. The vehicle seat assembly of claim 1, further comprising a plurality of tie down brackets and a plurality of openings, wherein the plurality of tie down brackets include the tie down bracket and the plurality of openings include the opening, such that each of the plurality of tie down brackets engages with one of the plurality of openings.

6. The vehicle seat assembly of claim 1, wherein the releasable fastener is a quick-release pin, a push-pull clip, a snap-fit clip, a slide latch, or a twist lock.

7. The vehicle seat assembly of claim 1, wherein, in the seated position, the seat cushion portion contacts at least a portion of the pair of sidewalls and the front wall of the underframe, such that the battery cavity is inaccessible.

8. The vehicle seat assembly of claim 1, wherein in the access position, the seat cushion portion is pivoted relative the underframe to expose the battery cavity.

9. The vehicle seat assembly of claim 1, wherein the frame member is coupled to the front wall.

10. The vehicle seat assembly of claim 1, further comprising a frame member opening formed in the frame member of the underframe.

11. The vehicle seat assembly of claim 10, wherein positioning of the frame member opening aligns with positioning of the opening in the front wall, such that the removable fastener may extend through the opening in the front wall and the frame member opening.

12. The vehicle seat assembly of claim 5, further comprising a plurality of frame member openings, wherein the plurality of frame member openings corresponds to a number of the plurality of openings.

13. The vehicle seat assembly of claim 10, wherein the frame member extends into the cavity from either side of the frame member opening.

14. The vehicle seat assembly of claim 1, wherein the frame member extends into the battery cavity.

* * * * *